Jan. 5, 1965     F. R. KNAEBE     3,163,903

LINE GRIPPING AND TENSION DEVICE

Filed April 8, 1963

INVENTOR.
FRANK R. KNAEBE

BY Chester W. Brown

ATTORNEY ly parallel with the side wall 2 and having a flange 17 disposed above the bottom flange 3 on the wall 2. The plate-like portion 16 is provided with relatively spaced screws 20 which extend through the slot 6 and support the plate-like portion for sliding motion in parallel relation to the wall 2. The flange 17 on the plate is substantially parallel to the flange 3 and the under side of the flange 17 is provided with elongated block 21 secured thereto by means of relatively spaced screws or bolts 22. An elongated rubber strip 23 is secured to the block 21 by any suitable means, such as glue. Thus two resilient rubber strips 5A and 23 are in opposed parallel relationship and serve as gripping elements when the device is operated as described hereinafter. The end of the plate-like portion 16 on the clamping member 15 most near the pulley 17 is provided with a vertically extending flange 25 which, as indicated in FIG. 4 projects beyond the device sufficient distance to afford manual operation of the clamping member 15.

3,163,903
LINE GRIPPING AND TENSION DEVICE
Frank R. Knaebe, 6048 N. 114th St., Milwaukee, Wis.
Filed Apr. 8, 1963, Ser. No. 271,123
1 Claim. (Cl. 24—126)

This invention relates to improvements in a device for tensioning a line, such as a clothes line, an electric line, telephone line or the like.

It is the primary object of this invention to provide a tensioning device with which a line to be tensioned, may be easily engaged with the device for tensioning operations and as easily disengaged when the line is to be released.

Another object is to provide a tensioning device which automatically locks and holds a line under tension when the operator completes his line tensioning operations.

It is also an object to provide a tensioning device which may be easily operated to release the line either subsequent to permanent anchoring of the line under tension or for any reason that it is desired to remove the line.

A further object is to provide a simple line tensioning device which may serve as a temporary anchoring device, such as for a clothes line, while attaching the line to a fixed object, which also serves as a means for relieving the line of tension at the point of attachment to the fixed object when it is desired to release the line and which may itself be easily detached from the line after the line has been released from the fixed object.

The foregoing and other objects will become apparent as the following description of the drawings progresses.

Figure 1:
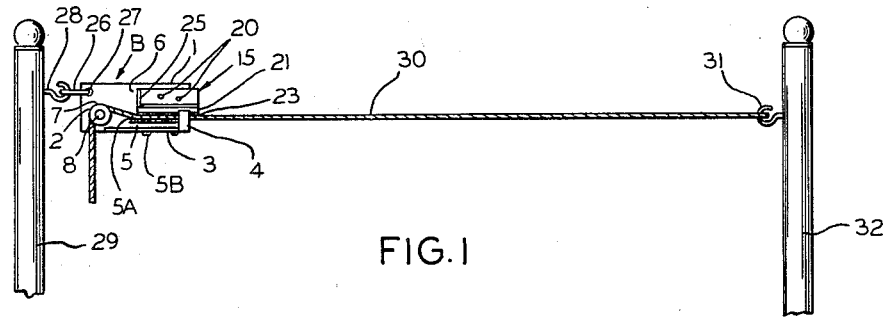
FIG. 1 is a view in side elevation illustrating an embodiment of my line tensioning device as it appears when in operation.
Figure 2:
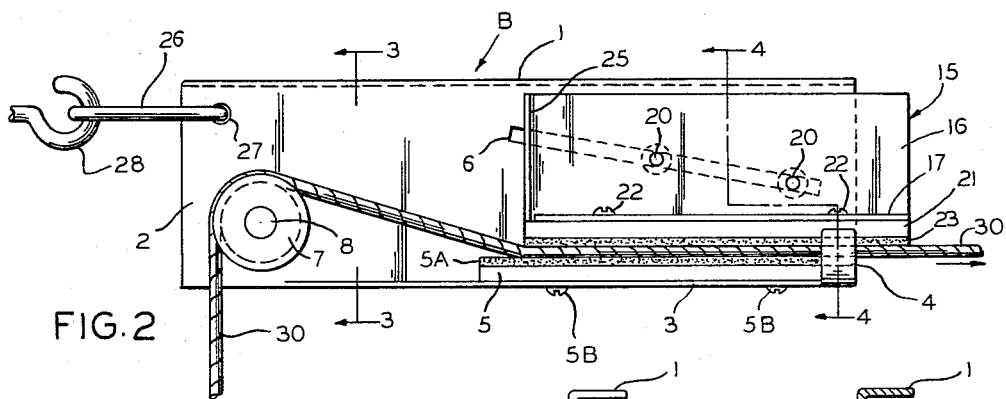
FIG. 2 is an enlarged view in side elevation of the device shown in FIG. 1.
Figures 3, 4, 5:
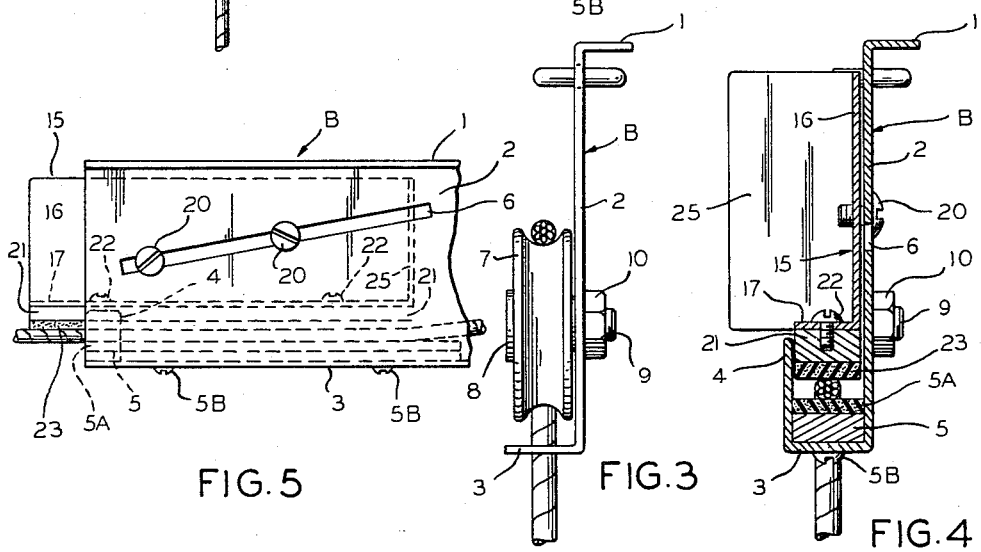
FIG. 3 is a sectional view taken on the line 3—3 of FIG. 2.
FIG. 4 is a sectional view taken on the line 4—4 of FIG. 2.
FIG. 5 is a fragmentary view showing the right hand end of the device as seen from the opposite side relative to FIG. 1.

The line tensioning device comprises an elongated base member B, preferably formed of sheet metal, having a top flange 1, as viewed in FIGS. 3 and 4, extending at right angles toward the right from the elongated side wall 2 and a bottom flange 3 extending at right angles, toward the left, from the side wall 2. The bottom flange 3 is provided, integral therewith, with a guard 4 spaced from and substantially parallel with the side wall 2, an elongated block 5 having rubber strip 5A attached thereto by suitable means such as glue, is mounted on and secured, in any suitable manner (as by means of screws 5B) to the upper side of the flange 3 and extends substantially more than one half the length thereof. The side wall 2 is provided with an elongated slot 6 extending downwardly toward the rear or right end of the side wall 2 as viewed in FIG. 2 and is disposed immediately above the area of the flange 3 covered by the rubber strip 5. An annularly grooved pulley 7 is rotatably mounted on a pin 8 and positioned on the side of the side wall 2 immediately above a plane co-incident with the bottom flange 3. It wall, of course, be understood that the pin 8 has a threaded end 9, of reduced diameter, extending through the side wall 2 and engaged by a nut 10 for securing the pin in position on the wall 2. The opposite end of the pin is flanged to retain the pulley 7 on the pin and permits free rotation thereof.

The clamping member 15 comprises a plate-like portion 16 paralleling the side wall 2 and having a flange 17 disposed above the bottom flange 3 on the wall 2. The plate-like portion 16 is provided with relatively spaced screws 20 which extend through the slot 6 and support the plate-like portion for sliding motion in parallel relation to the wall 2. The flange 17 on the plate is substantially parallel to the flange 3 and the under side of the flange 17 is provided with elongated block 21 secured thereto by means of relatively spaced screws or bolts 22. An elongated rubber strip 23 is secured to the block 21 by any suitable means, such as glue. Thus two resilient rubber strips 5A and 23 are in opposed parallel relationship and serve as gripping elements when the device is operated as described hereinafter. The end of the plate-like portion 16 on the clamping member 15 most near the pulley 17 is provided with a vertically extending flange 25 which, as indicated in FIG. 4 projects beyond the device sufficient distance to afford manual operation of the clamping member 15.

An eye 26 is pivotally mounted at 27 on the side wall 1 for engagement with a hook 28 secured to a clothes line post 29.

When the line tensioning devices has been mounted on the post 29 by engaging the eye 26 with hook 28 and a clothesline 30 has been attached to the hook 31 on the clothesline post 32, the clamping member 15 will be manually moved, by means of flange 25, toward the pulley 7. In doing so, the clamping member will be caused to move vertically away from the flange 3, block 5 and rubber strip 5A by reason of the inclined slot 6 and bolts 20 slidable therein. The line 30 will then be laid over the rubber strip 5A and the pulley 7 and the clamping member 15 allowed to return toward the line and be engaged therewith. To tension the line 30, the operator will pull the line across the strip 5A and over the pulley. This is done easily since the clamping member 15 will not resist movement of the line toward the pulley. However, any tendency of the line to move in the opposite direction will, by reason of the frictional engagement of the strip 23, cause the clamping member to move into firmer engagement with the line and force it into firmer engagement with the strip 5A. Consequently any pull on the line toward the post 32 will increase the clamping force on the line in a ratio directly proportional to the force of the pull.

The line 30 may be released by first pulling on the line toward the post 29 and then manually moving the clamping member, as previously, toward the pulley. When this is accomplished, the line can then move freely and be lifted from the clamping device.

It will be obvious that the strips 5A and 23 provide an extensive area of contact with the line and that this area of contact increases as the clamping force is increased, due to the fact that the strips are of resilient material and permit, in effect, the embedding of the line in the resilient material. Furthermore, the strips, being of resilient material, do not damage the line in the gripped area. The guard 4 serves to prevent accidental removal of the line after contact of the clamping member therewith.

From the foregoing, it is apparent that the invention herein disclosed comprises a novel line gripping and tensioning device which may be easily engaged with and disengaged from a line to be tensioned, which automatically grips and holds the line under tension, which may serve as a line anchoring device at one end thereof or as a temporary tensioning device while the line is permanently affixed to a line support, such as a clothespost, and then released, which provides a large area of clamping contact, which provides an area of increasing contact in direct ratio to increasing tensioning force and which minimizes possible damage to the line in the area of gripping contact with the line.

I claim:

A line gripping and tensioning device, the combination of a base member comprising an elongated side wall portion having a top flange integral therewith and projecting in normal relation from one side thereof and having also a bottom flange integral therewith and projecting in normal relation from the opposite side of said wall portion, a guard integral with said bottom flange spaced from said wall portion at one end thereof and projecting from said bottom flange in parallel relation to said wall portion, pulley rotatably mounted on said other side of said wall portion adjacent the other end thereof and disposed above a plane coincident with said bottom flange, an eye pivotally mounted on said wall portion at said other end of said wall portion and above said pulley, said bottom flange terminating at a point short of said other end of said wall portion and beneath said pulley, an elongated bar mounted on and secured to said bottom flange and having a resilient strip extending the length thereof and secured thereto, said side wall portion having an elongated slot extending from a point adjacent said one end of wall portion and diverging relative to said bottom flange to a point substantially midway of said wall portion, and a clamping member having adjacent and parallel to said wall portion on said other side thereof, a plate-like portion, and having a flange integral therewith and normal thereto disposed above said bottom flange, relatively spaced guide pins mounted on the plate-like member and projecting through said slot in said side wall portion and jointly disposed in a plane diverging from said bottom flange at an angle substantially coinciding with the angle of divergence of said slot, an elongated bar secured to the flange on said plate-like portion of said clamping member on a side thereof most adjacent said bottom flange, and an elongated resilient strip secured to said last mentioned elongated bar on a side thereof most adjacent said first mentioned resilient strip, the wall portion of said base member being disposed in a vertical plane when in use, whereby a line disposed between said resilient strips and over said pulley extends at an angle diverging from a plane coinciding with said bottom flange and over said pulley.

References Cited in the file of this patent

UNITED STATES PATENTS

| | | |
|---|---|---|
| 1,632,616 | Molique | June 14, 1927 |
| 1,740,982 | Hillier | Dec. 24, 1929 |
| 2,087,865 | Walker | July 20, 1937 |